US012780391B2

(12) United States Patent
Melot

(10) Patent No.: US 12,780,391 B2
(45) Date of Patent: Nov. 3, 2026

(54) AIR DIFFUSER INTENDED TO BE INSTALLED IN A COOLING ROTATING INTERFACE OF A PROPULSION ORIENTED DEVICE

(71) Applicant: AETC SAPPHIRE, Saint Petersburg (RU)

(72) Inventor: Julien Melot, Champigneulles (FR)

(73) Assignee: AETC SAPPHIRE, Saint Petersburg (RU)

( * ) Notice: Subject to any disclaimer, the term of this patent is extended or adjusted under 35 U.S.C. 154(b) by 775 days.

(21) Appl. No.: 18/037,605

(22) PCT Filed: Oct. 14, 2021

(86) PCT No.: PCT/IB2021/059446
§ 371 (c)(1),
(2) Date: May 18, 2023

(87) PCT Pub. No.: WO2022/106926
PCT Pub. Date: May 27, 2022

(65) Prior Publication Data

US 2023/0415877 A1 Dec. 28, 2023

(30) Foreign Application Priority Data

Nov. 19, 2020 (EP) .................................... 20306408

(51) Int. Cl.
*B63H 21/38* (2006.01)
*B63H 21/17* (2006.01)
*H02K 9/04* (2006.01)

(52) U.S. Cl.
CPC ............. *B63H 21/38* (2013.01); *B63H 21/17* (2013.01); *H02K 9/04* (2013.01)

(58) Field of Classification Search
CPC ........ B63H 21/38; B63H 21/17; B63H 5/125; B63H 2005/1258; H02K 9/04; H02K 5/207; B63J 2/12
See application file for complete search history.

(56) References Cited

U.S. PATENT DOCUMENTS 5,403,216 A * 4/1995 Salmi ..................... H02K 5/203 440/6
9,783,279 B2 * 10/2017 Kiiskila ................ F16C 37/007
2015/0329191 A1 * 11/2015 Kiiskila ................ F04D 29/588 417/423.8

FOREIGN PATENT DOCUMENTS

EP 2 944 561 A1 11/2015
WO WO 01/81170 A1 11/2001

OTHER PUBLICATIONS

International Search Report issued in International Application No. PCT/IB2021/059446 on Nov. 9, 2021.

(Continued)

*Primary Examiner* — Eldon T Brockman
(74) *Attorney, Agent, or Firm* — Hoffmann & Baron, LLP

(57) ABSTRACT

An air diffuser configured to be installed in a cooling rotating interface of a propulsion oriented device, the propulsion oriented device being pivotable relative to a vessel around an axis of rotation, the air diffuser capable of being attached to the propulsion oriented device. The air diffuser includes a main portion capable of being surrounded by an air box attached to the vessel so as to delimit, inside a volume delimited by the air box, a first fluid path for a cold fluid flow and a second fluid path for a warm fluid flow from each other. The main portion is a solid of revolution around the axis of rotation.

16 Claims, 10 Drawing Sheets

(56) References Cited

OTHER PUBLICATIONS

Written Opinion of the International Searching Authority issued in International Application No. PCT/IB2021/059446 on Nov. 9, 2021.

* cited by examiner

AIR DIFFUSER INTENDED TO BE INSTALLED IN A COOLING ROTATING INTERFACE OF A PROPULSION ORIENTED DEVICE

CROSS-REFERENCE TO RELATED APPLICATIONS

The present application is the U.S. National Phase of PCT/IB2021/059446, filed on 14 Oct. 2021, which claims priority to European Patent Application No. 20306408.4, filed on 19 Nov. 2020, the entire contents of which are incorporated herein by reference.

BACKGROUND

Field

The present invention relates to the field of propulsion oriented devices for a vessel, and more specifically to a cooling rotating interface and an air diffuser intended to be installed in such a cooling rotating interface.

Related Art

Propulsion oriented devices, also known under the acronym "POD", are used for propulsion of ships, vessels, or the like. A propulsion oriented device generally includes a gondola attached to a part of the vessel, for instance, to the hull of the vessel. The gondola is mechanically linked to the vessel in such a way that it may pivot about an axis, generally substantially vertical.

The gondola accommodates a propulsion shaft which supports, for example, a propeller. The rotation of the propulsion shaft makes the propeller rotate and causes propulsion of the vessel.

In order to ensure the rotation of the propulsion shaft, some propulsion oriented devices include an electric motor accommodated inside the gondola. For instance, the electric motor may include a stator attached to the gondola and a rotor attached to the propulsion shaft.

A drawback of such an arrangement is that the electric motor may generate an important amount of heat. To remedy this drawback, there has been proposed a cooling system including an airflow generator mounted on the vessel, a cooler able to cool an airflow generated by the airflow generator, a duct to convey the cold airflow from the cooler to the electric motor, and a duct to convey a warm airflow from the electric motor to the cooler. Since the airflows need to have a portion within the ship and a portion within the gondola, a cooling rotating interface is foreseen to pass the airflows over the boundary between the vessel to the gondola. To do so, a cooling rotating interface generally includes, in the referential of the vessel, a static air box and a rotating air diffuser. A dynamic sealing is implemented between the air box and the air diffuser, which isolates the cold and warm airflows from each other.

Although such cooling systems are generally considered satisfactory, it appears sometimes that the pressure drop inside the ducts of the cooling system depend on the steering angular position. As a result, the cooling performance of the electric motor depends on the steering angle of the propulsion oriented device. For a vessel equipped with more than one propulsion oriented device, angular orientation of some of the propulsion oriented devices may lead to performance power imbalance and/or derating.

The invention aims at overcoming the above-mentioned drawbacks.

More specifically, the invention aims at providing a cooling rotating interface which allows obtaining flow rates for the warm and cold fluid flows which do not depend on a steering angular position of a propulsion oriented device According to a first aspect of the invention, there is proposed an air diffuser intended to be installed in a cooling rotating interface of a propulsion oriented device, the propulsion oriented device being pivotable relative to a vessel around an axis of rotation, the air diffuser being intended to be attached to the propulsion oriented device, and including a main portion intended to be surrounded by an air box attached to the vessel so as to delimit, inside the volume delimited by the air box, a first fluid path for a cold fluid flow and a second fluid path for a warm fluid flow from each other.

According to a general feature of this air diffuser, the main portion is a solid of revolution around the axis of rotation.

The main portion being a solid of revolution around the axis of rotation allows having the same cooling efficiency regardless of the orientation of the propulsion oriented device with respect to the vessel.

Preferably, the main portion includes an inner cylinder of revolution around the axis of rotation.

In an embodiment, the inner cylinder has a circular axial cross section, the air box having a circular axial cross section, the axial cross section of the air box having a diameter equal to a diameter of the axial cross section of the inner cylinder multiplied by a factor within a range 1.3 to 1.5.

Such an arrangement allows having an area for the cold airflow substantially equal to the area for the warm airflow, taking into account the presence of elements typically present in a cooling rotating interface of propulsion oriented devices, such as traverses or gratings, which obstruct partially the fluid flow inside the inner cylinder.

In an embodiment, the main portion includes a truncated cone having a first smaller diameter circular end and a second larger diameter circular end, the first circular end being intended to be closer to the vessel than the second circular end.

Such an arrangement allows having a transition between a cooling rotating interface and an internal volume of the propulsion oriented device, in a particularly adapted manner for a part manufactured by boilermaking.

In an advantageous manner, the truncated cone includes an inner protrusion extending radially inwards from the second circular end.

The inner protrusion allows supporting a ring for sealing the first and second fluid paths from each other.

One may also foresee a peripheral portion radially surrounding the main portion and including an outer cylinder of revolution intended to be located radially outwards the air box, with reference to the axis of rotation.

Having a peripheral portion including a cylinder of revolution allows keeping the same area for the warm airflow substantially equal to the area for the cold airflow despite increase of the latter in the truncated cone, while reducing the volume of a closed space intended to contain oil for lubricating a steering assembly. In case the central channel is used for the warm airflow, the same advantages may be obtained.

Preferably, the outer cylinder has a circular axial cross-section, a diameter of the outer cylinder being equal to a diameter of the axial cross-section of the second circular end multiplied by a factor within a range 1.2 to 1.6.

Such an arrangement allows increasing the diameter at the same level as the truncated cone while avoiding perturbation of the fluid flow due to excessive speed variations of the fluid on a short distance.

One may also foresee a plurality of radially extending joining parts attaching the peripheral portion to the main portion.

In an embodiment, the joining parts have a thickness along the tangential direction within a range 10 mm to 30 mm.

Preferably, the joining parts have a thickness along the tangential direction within a range 12 mm to 20 mm.

In another embodiment, the joining parts are regularly spread over the circumference of the main portion so that the angle between two adjacent joining parts taken among the plurality of joining parts is within 30° and 50°.

Such a plurality of joining parts allows attaching the main and peripheral portions to each other without excessively perturbating the fluid flow between the air diffuser and the air box.

In an embodiment, the peripheral portion includes a crown protruding radially outwards from the outer cylinder.

This crown allows attaching the air diffuser to an end cover attached to a slewing bearing or a steering arrangement of the propulsion oriented device.

One may also foresee at least one static seal ring chosen among a first static seal ring in axial contact with the crown and a second static seal ring in radial contact with the outer cylinder.

This static seal ring allows implementing a sealing at a contact location between the peripheral portion and the end cover, inter alia, so as to seal the closed space intended to contain oil for lubricating the steering assembly.

In another embodiment, the peripheral portion includes a first collar extending radially inwards from a first end of the outer cylinder, the first end being intended to be proximate to the vessel, the peripheral portion including a cylindrical protrusion extending axially from an inner edge of the first collar and on a side of the first collar opposite to the side in which the outer cylinder is located.

The cylindrical protrusion allows supporting a dynamic seal ring between the peripheral portion and the steering top cover, inter alia, so as to seal the closed space intended to contain oil for lubricating the steering assembly.

According to another aspect of the invention, there is proposed a cooling rotating interface for a propulsion oriented device pivotable relative to a vessel around an axis of rotation, the cooling rotating interface including an air box intended to be attached to the vessel, a first fluid path for a cold fluid flow, a second fluid path for a warm fluid flow, and an air diffuser as defined above, wherein the air diffuser delimits the first and second fluid paths from each other.

Preferably, the air box includes a part of revolution coaxial to the main portion, the cooling rotating interface including a labyrinth seal located axially between the air diffuser and the part of revolution.

This labyrinth seal allows implementing a dynamic seal so as to isolate the airflows from each other.

BRIEF DESCRIPTION OF THE DRAWINGS

The present invention and its advantages will be better understood by studying the detailed description of a specific embodiment given by way of nonlimiting examples and illustrated by the appended drawings on which.

DETAILED DESCRIPTION

Figure 1:
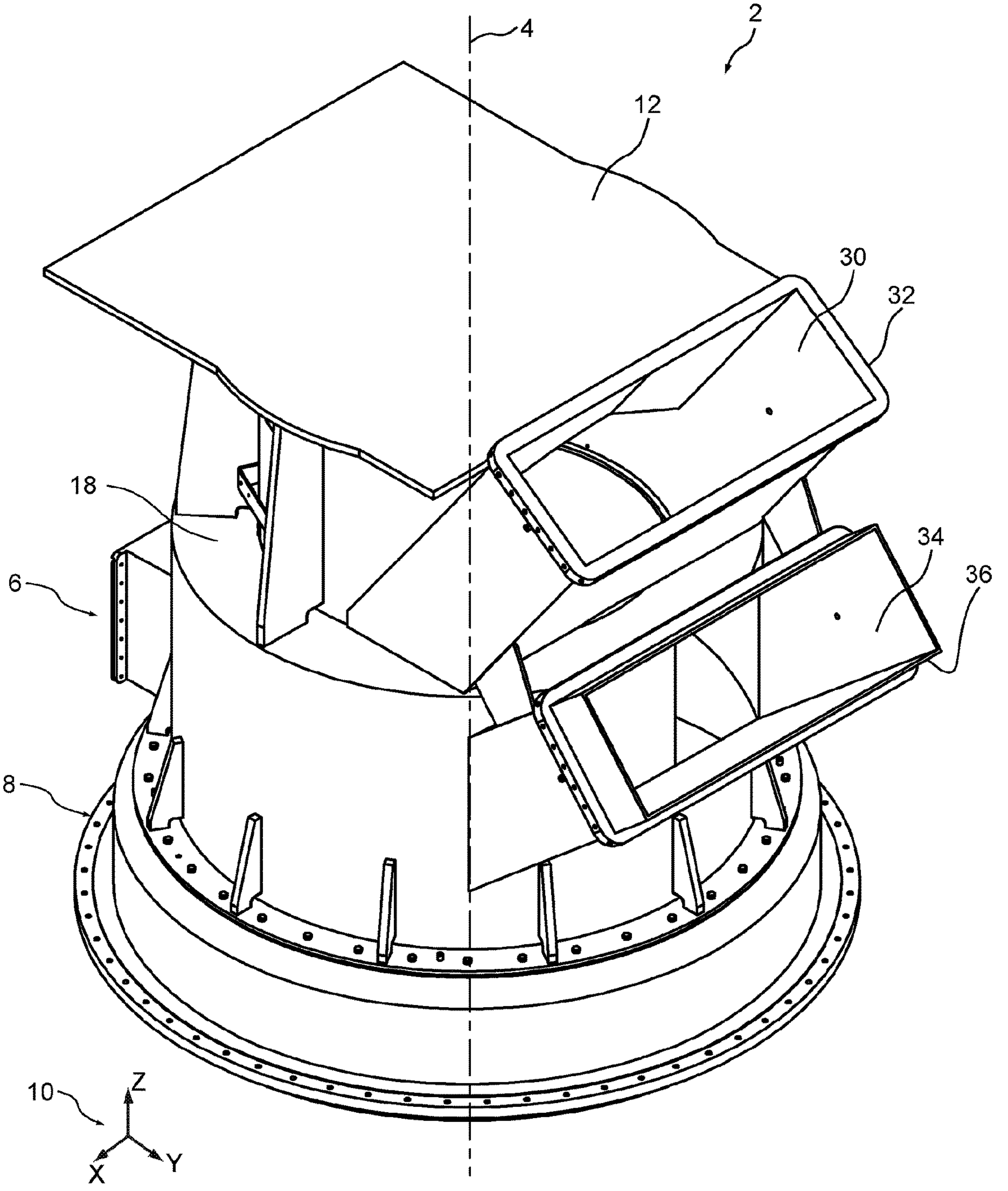
FIG. 1 is a perspective view of a cooling rotating interface according to one embodiment of the present invention.
Figure 2:
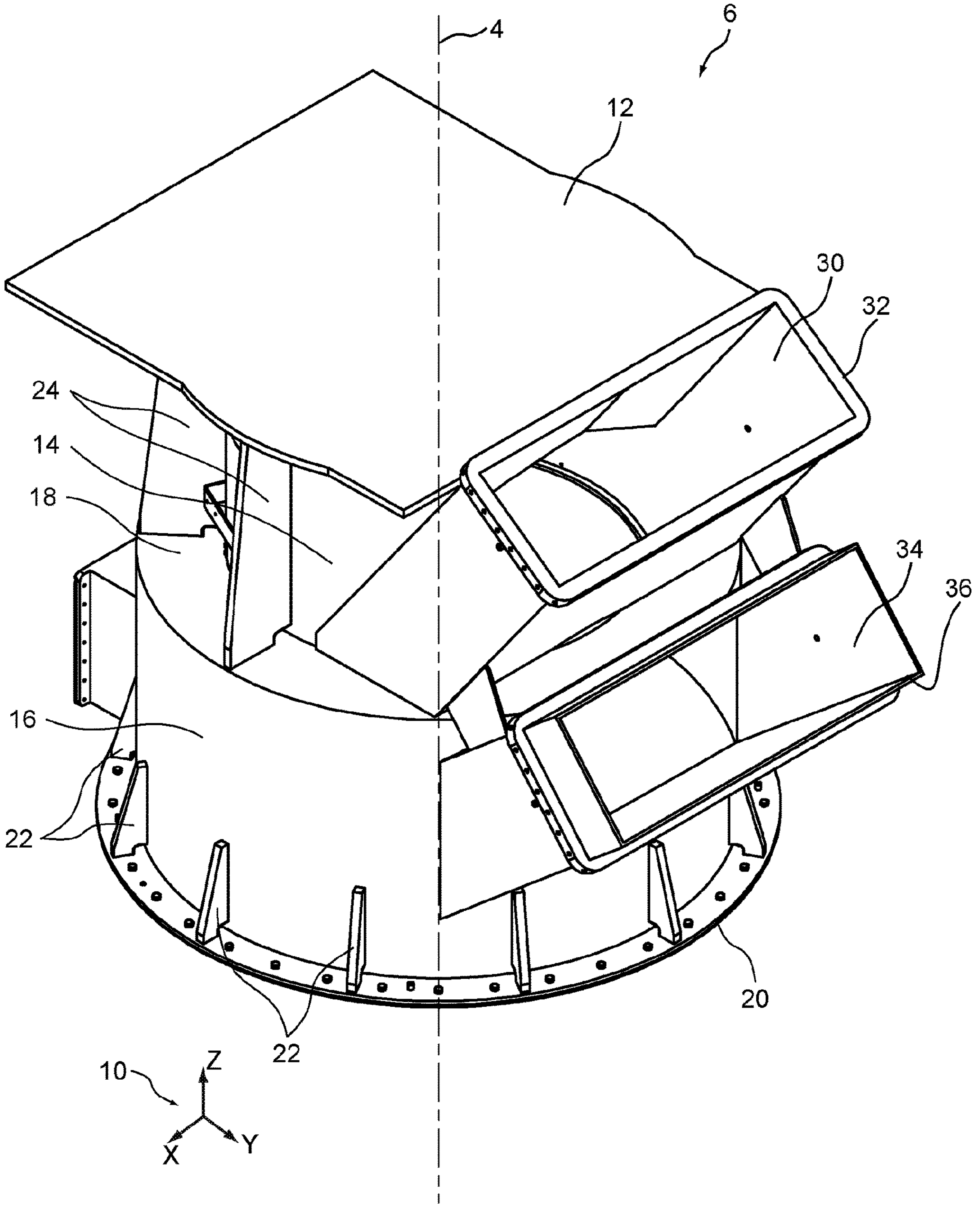
FIG. 2 is a perspective view of an air box of the cooling rotating interface of FIG. 1.
Figure 3:
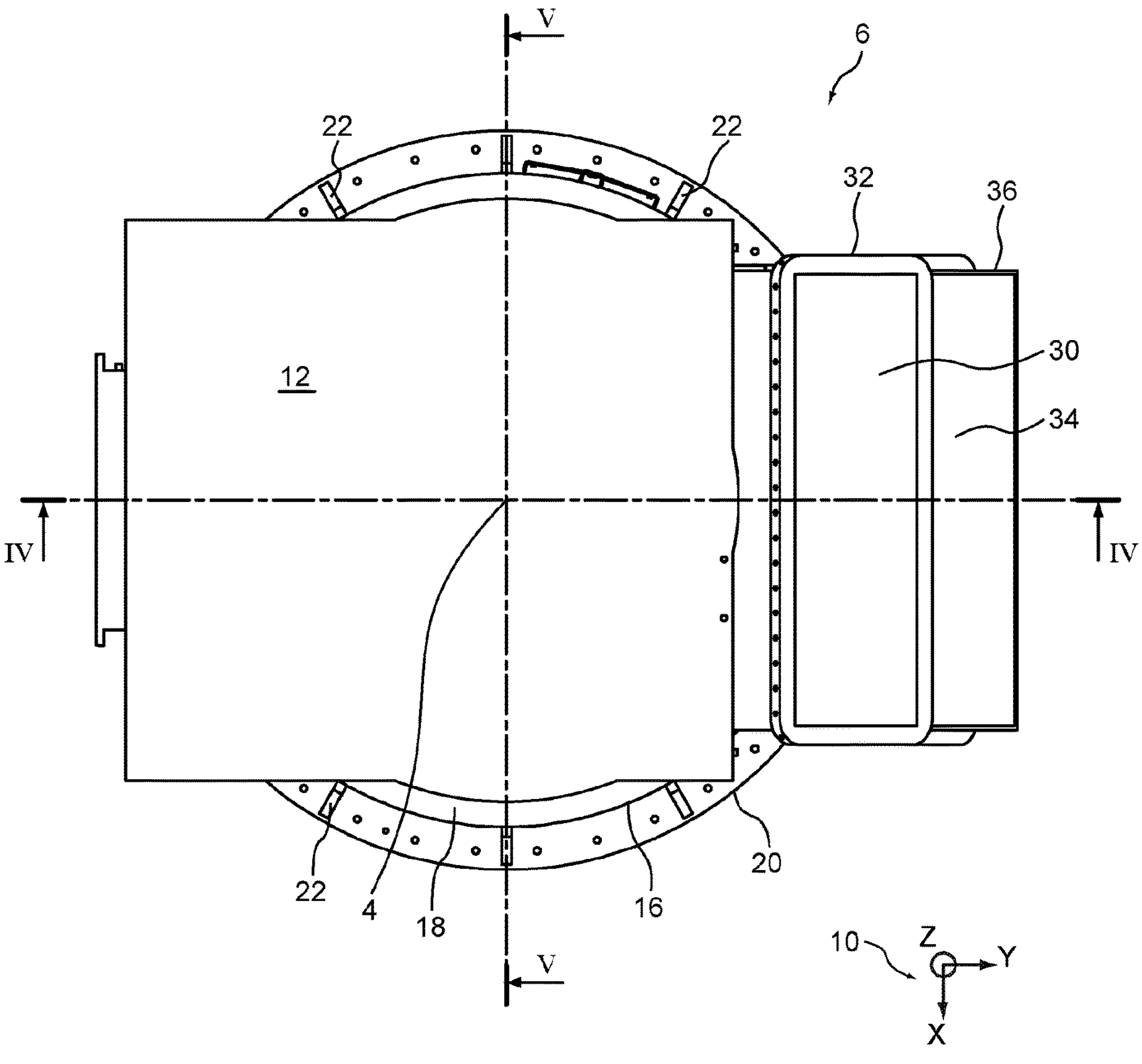
FIG. 3 is a top view of the air box of FIG. 2.
Figure 4:
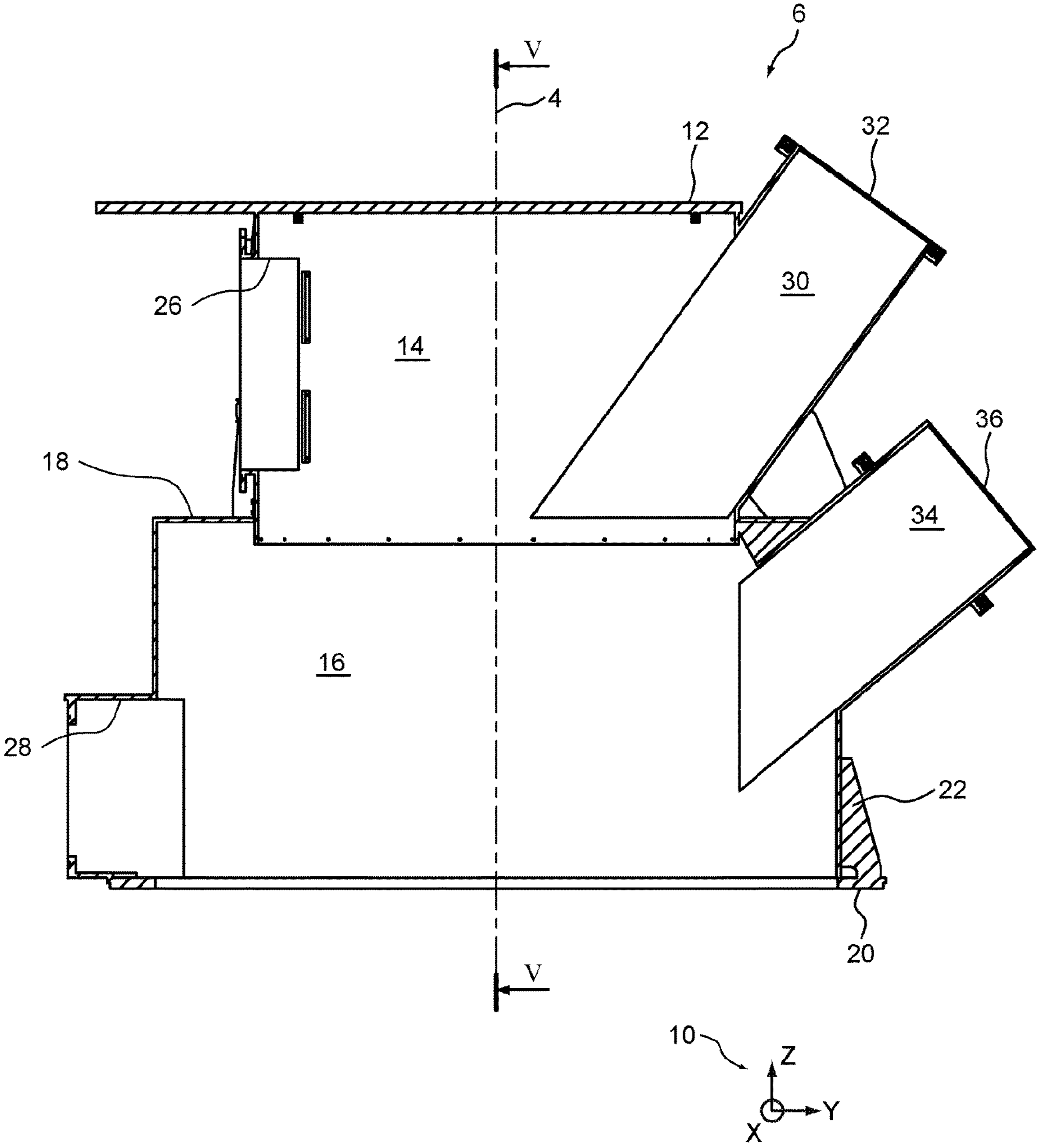
FIG. 4 is a cross-sectional view of the airbox of FIGS. 2 and 3.
Figure 5:
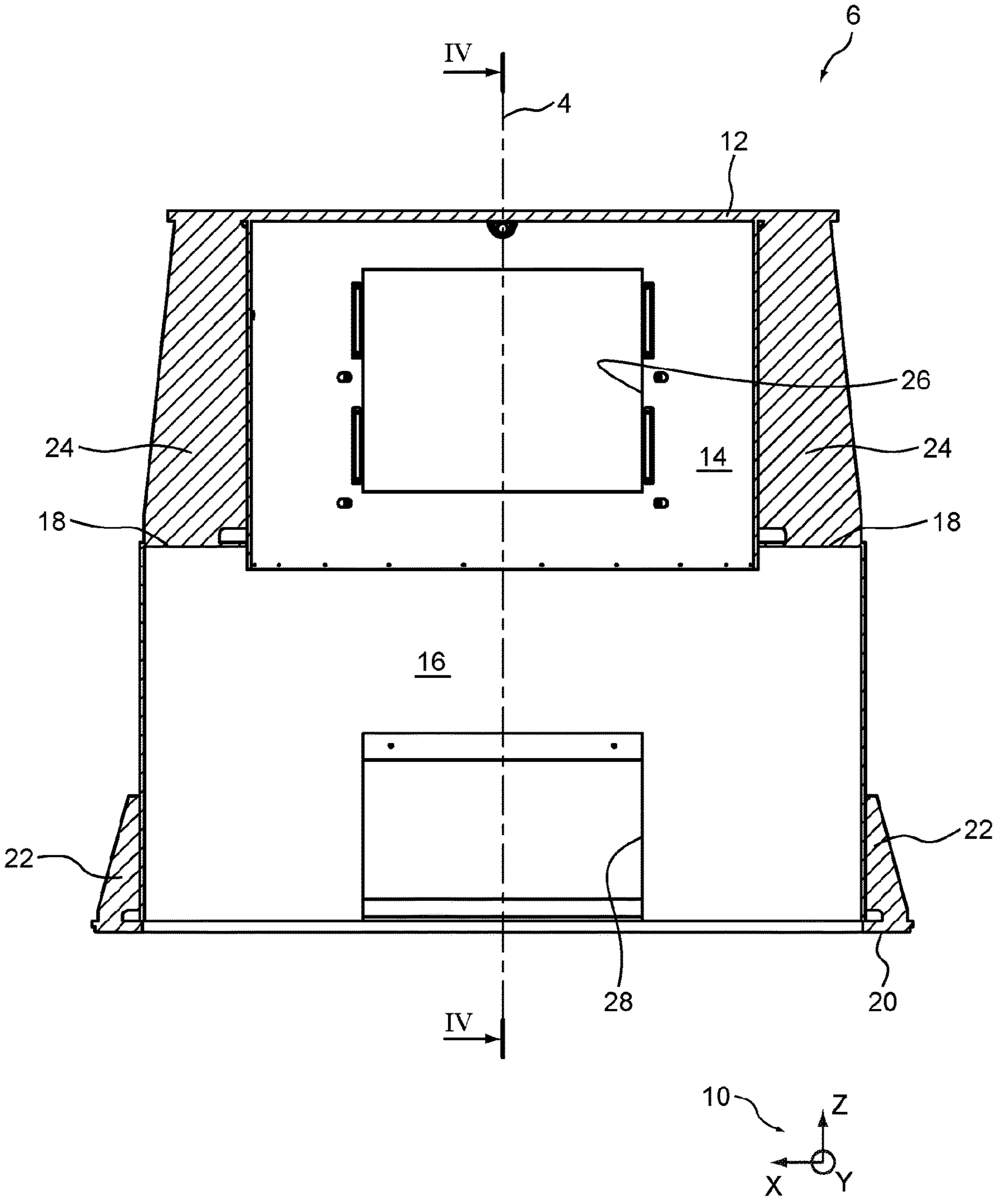
FIG. 5 is another cross-sectional view of the air box of FIGS. 2 to 4.
Figure 6:
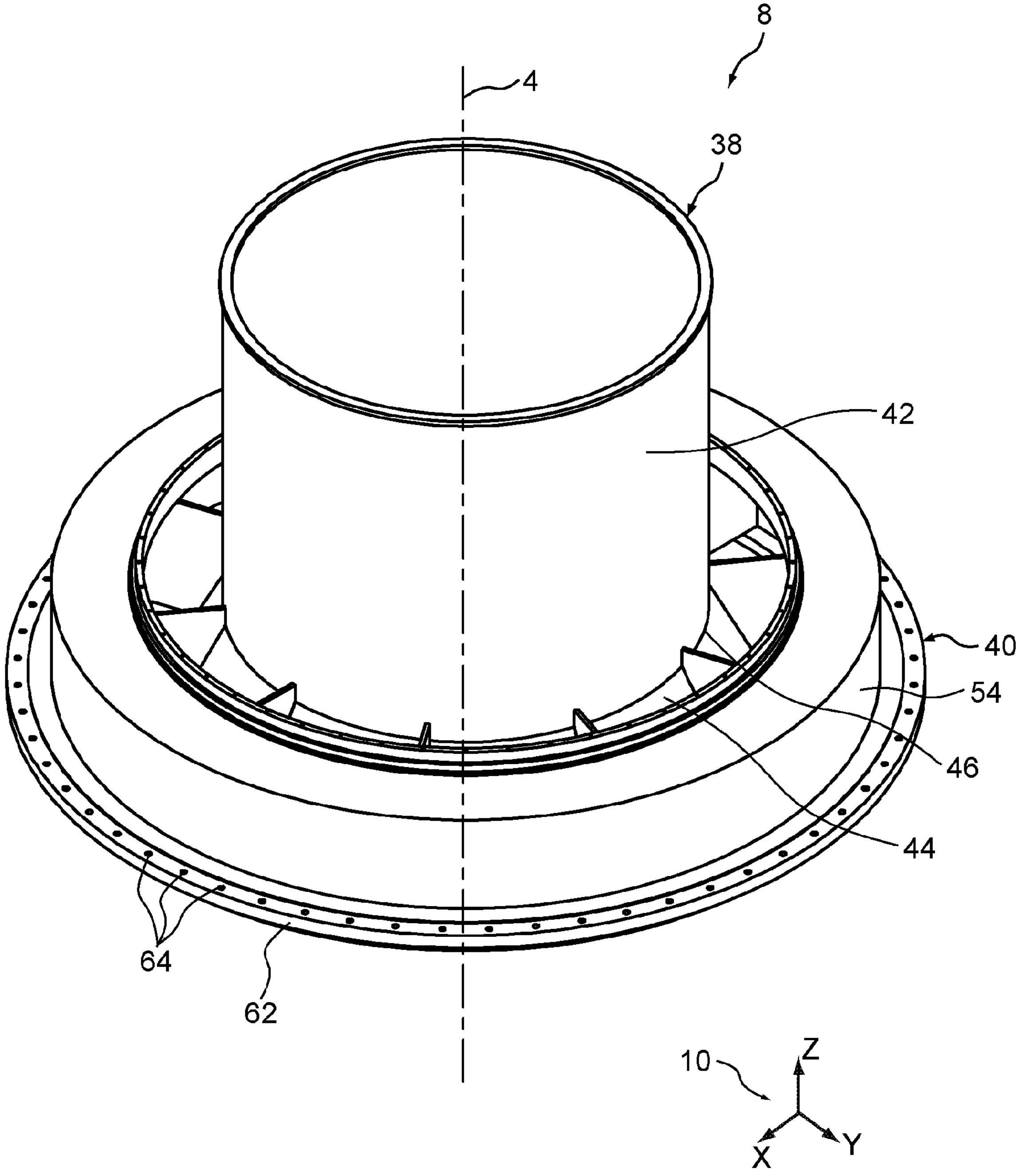
FIG. 6 is a perspective view of an air diffuser of the cooling rotating interface of FIG. 1.
Figure 7:
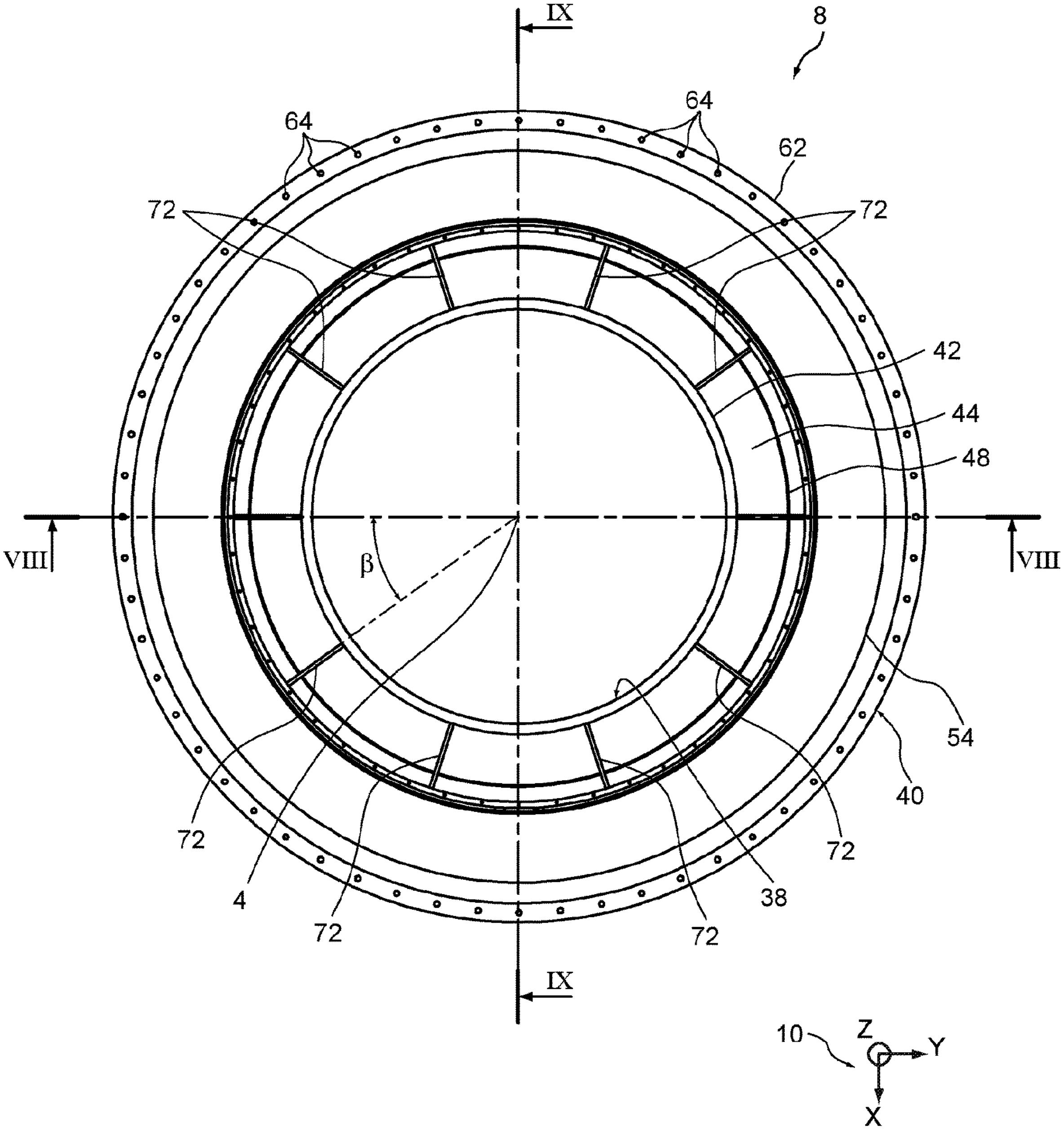
FIG. 7 is a top view of the air diffuser of FIG. 6.
Figure 8:
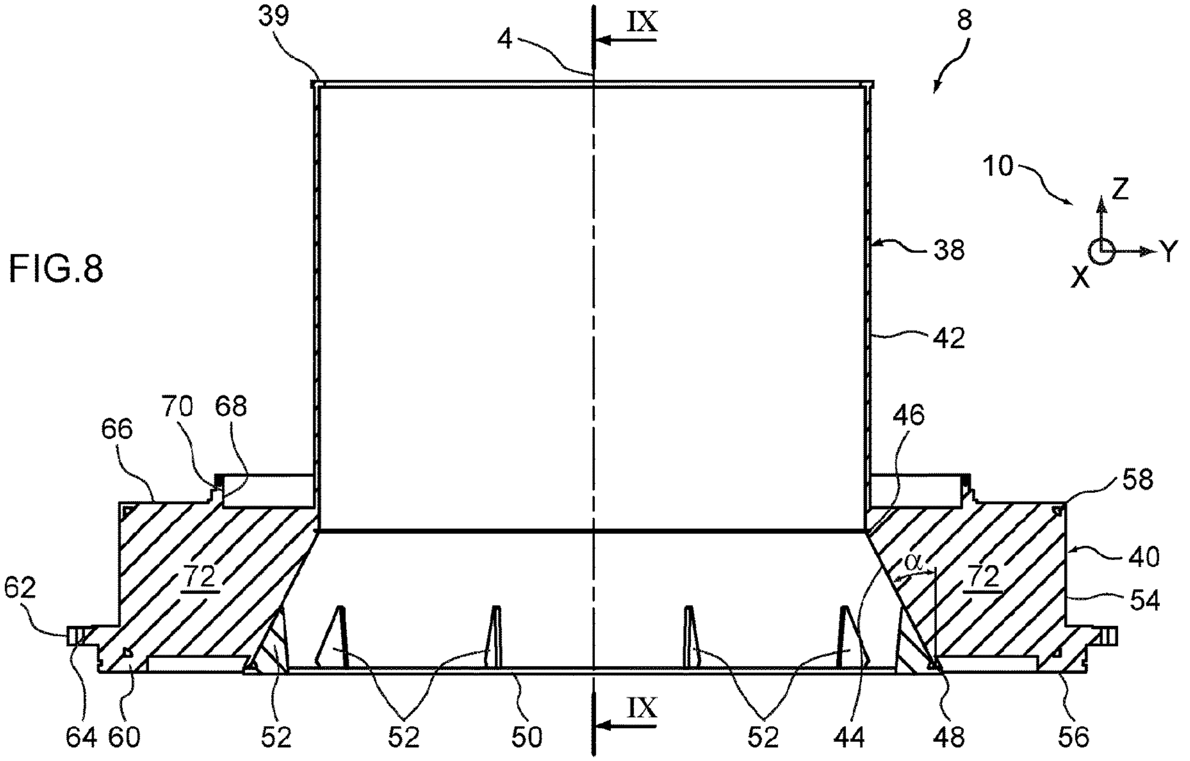
FIG. 8 is a cross-sectional view of the air diffuser of FIGS. 6 and 7.
Figure 9:
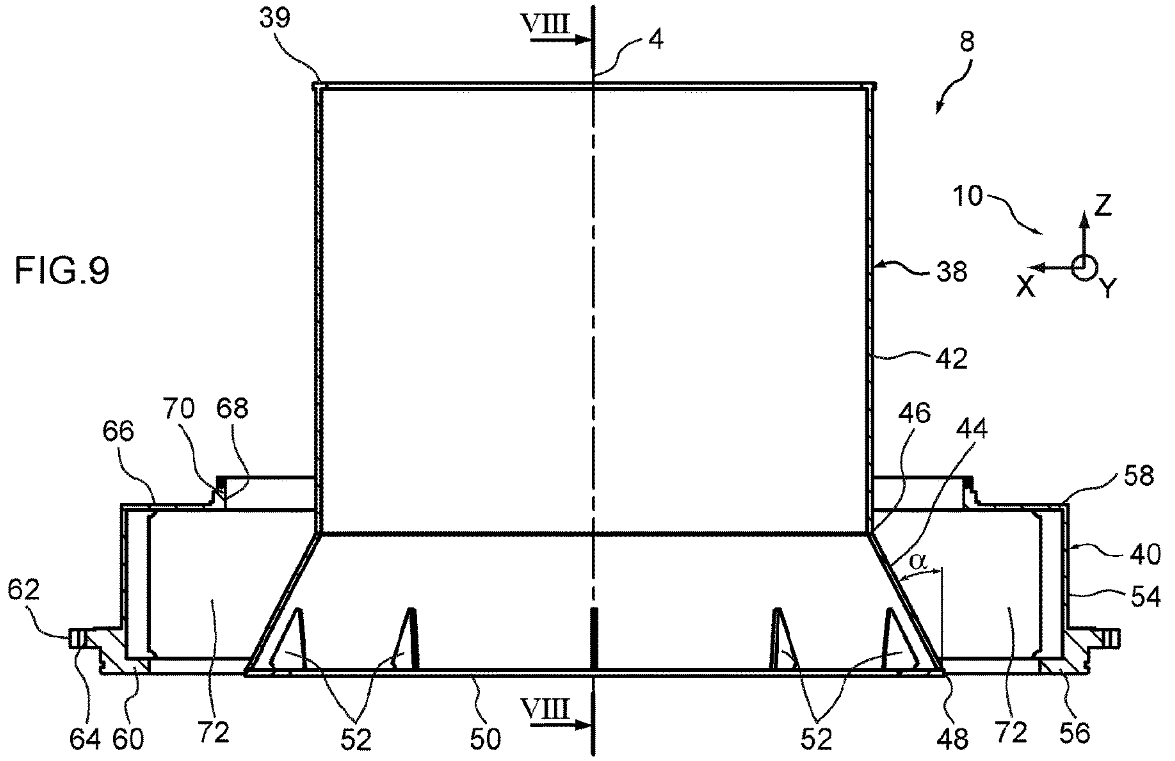
FIG. 9 is another cross-sectional view of the air diffuser of FIGS. 6 to 8.

With reference to FIG. 1, there is schematically depicted a cooling rotating interface 2. The cooling rotating interface 2 is intended to be installed between a propulsion oriented device (not shown) and a part of a vessel, for instance, the hull of the vessel (not shown). The vessel is located above the cooling rotating interface 2 whereas the propulsion oriented device is located below the cooling rotating interface 2. The propulsion oriented device is pivotable relative to the vessel around an axis of rotation 4.

The cooling rotating interface 2 is intended to lead a cold airflow from a cooler located inside the vessel into an electric motor located inside the propulsion oriented device, and to lead a warm airflow from the electric motor into the cooler. To that end, the cooling rotating interface 2 includes an air box 6 and an air diffuser 8. The air box 6 is attached to the vessel whereas the air diffuser 8 is attached to the propulsion oriented device. Hence, the air diffuser 8 is able to rotate, with respect to the air box 6, about the axis of rotation 4.

There is defined an orthonormal direct vector basis 10 associated with the air box 6. The basis 10 consists of a vector X, a vector Y and a vector Z. The vector Z is parallel to the axis of rotation 4.

In the present application, the terms "axial", "radial", "tangential" and variations thereof will be understood as referring to the axis of rotation 4. The words "cylinder" and "cylindrical" will be understood according to their common definition, being namely that a cylindrical surface is a surface consisting of all the points on all the lines which are parallel to a given line and which pass through a fixed plane curve in a plane not parallel to the given line. The words "up", "low", "down" and variations thereof will be understood as referring to the basis 10 when the cooling rotating interface 2 is normally installed on a vessel, that is, assuming that the vector Z is substantially vertically upwardly directed.

Referring to FIGS. 1 to 5, the air box 6 includes an upper, flat plate 12 perpendicular to the vector Z.

The air box 6 further includes an upper cylinder of revolution 14 and a lower cylinder of revolution 16. The cylinders 14 and 16 have a circular axial cross-section around the axis 4 and with respective diameters $d_{14}$, $d_{16}$. The diameter $d_{16}$ is strictly larger than the diameter $d_{14}$. More specifically, the diameter $d_{14}$ is within a range 1700 mm to 1900 mm and the diameter $d_{16}$ is within a range 2500 mm to 2750 mm. A lower end of the cylinder 14 is linked to an upper end of the cylinder 16 by a flat, frontal surface 18 perpendicular to the vector Z. The upper plate 12 is linked to an upper end of the cylinder 14.

On the lower end of the cylinder 16, the air box 6 includes a collar 20. The collar 20 extends radially outwards from the lower end of the cylinder 16.

The air box 6 includes a plurality of reinforcing ribs 22, e.g., eleven (11) reinforcing ribs 22. The reinforcing ribs 22 are intended to strengthen the fixation of the collar 20 to the cylinder 16. The air box 6 further includes a plurality of reinforcing ribs 24, e.g., four (4) reinforcing ribs 24. The reinforcing ribs 24 extend radially outwards from the cylinder 14. The reinforcing ribs 24 extend axially between the upper plate 12 and the frontal surface 18.

The air box 6 includes a rectangular hatch 26 arranged on the cylinder 14. The hatch 26 is intended to allow a technician access, from the vessel, to the inner volume of the propulsion oriented device.

The air box 6 further includes a hatch 28 arranged on the cylinder 16, proximate to the collar 20. The hatch 28 is intended to allow implementing a maintenance of a seal ring installed proximate to the collar 20, such as an air diffuser-steering top cover oil dynamic seal.

The air box 6 further includes an upper duct 30 with an upper port 32, and a lower duct 34 with a lower port 36. The ducts 30 and 34 are intended to be fluidly connected, via the respective ports 32 and 36, with flexible tubes of a cooling system of the propulsion oriented device. More specifically, the upper duct 30 is intended to be connected to a flexible tube fluidly connected to an outlet of a cooler (not depicted) of the cooling system, whereas the lower duct 34 is intended to be fluidly connected to a flexible tube fluidly connected to the inlet of the cooler. An airflow generator, such as a fan (not depicted), is mounted on one of these flexible tubes.

Hence, through the air box 6, a cold airflow coming from the cooler passes through the upper duct 30 whereas a warm airflow, directed towards the cooler, passes through the lower duct 34.

Without departing from the scope of the invention, one may connect the upper duct 30 to the inlet of the cooler and connect the lower duct 34 with the outlet of the cooler. In such case, the cold airflow passes through the lower duct 34 whereas the warm airflow passes through the upper duct 30.

Referring now to FIGS. 6 to 9, the air diffuser 8 includes a main portion 38 and a peripheral portion 40. The peripheral portion 40 radially surrounds the main portion 38. More specifically, the radial location of the peripheral portion 40 is outwards the radial location of the cylinder 16 of the air box 6, and the axial location of the peripheral portion 40 is right below the cylinder 16. The main portion 38 is located radially inside the cylinder 16. The main portion 38 includes a top end 39 axially located right below the cylinder 14. The cylinder 14 includes a seal 41 and/or a labyrinth seal (not depicted) implementing a dynamic sealing between the cylinder 14 and the top end 39.

The main portion 38 includes an upper cylinder of revolution 42 and a lower truncated cone 44. The axis of revolution of the cylinder 42 and the axis of revolution of the truncated cone 44 are the same as the axis of rotation 4. The angle $\alpha$ of the truncated cone 44 with reference to the direction of the vector Z is within 25° and 30°.

The axial cross-section of the cylinder 42 is circular around the axis of rotation 4 and has a diameter $d_{42}$ equal to the diameter $d_{14}$. The truncated cone 44 includes an upper end 46 and a lower end 48. The truncated cone 44 is joined to the cylinder 42 by its upper end 46. The ends 46 and 48 are two circles around the axis of rotation 4, having respective diameters $d_{46}$ and $d_{48}$. The diameter $d_{46}$ equals the diameter $d_{42}$. The diameter $d_{48}$ is strictly larger than the diameter $d_{46}$. In the depicted embodiments, the diameter $d_{48}$ is within a range 2150 mm to 2350 mm.

Hence, the main portion 38 is a solid of revolution around the axis of rotation 4. The main portion 38 delimits a first fluid path, being inside the cylinder 42 and the cone 44, for the cold airflow delivered by the upper duct 30, from a second fluid path, being between the cylinder 42 and the cylinder 16, for the warm fluid flow collected by the lower duct 34.

The main portion 38 includes a radial protrusion 50 extending radially inwards from the truncated cone 44, at its lower end 48. The main portion includes a plurality of reinforcing ribs 52, e.g., ten (10) reinforcing ribs 52, which strengthen the fixation of the protrusion 50 to the truncated cone 44. The protrusion 50 intends to allow the fixation of a static seal ring (not depicted) located inside the inner volume of the propulsion oriented device.

The peripheral portion 40 includes a cylinder of revolution 54. The cylinder 54 has a circular axial cross-section around the axis of rotation 4 with a diameter $d_{54}$ within a range 2600 mm to 3400 mm. The cylinder 54 includes a lower end 56 and an upper end 58. The peripheral portion 40 includes a lower collar 60 extending radially inwards from the cylinder 54, at its lower end 56.

The peripheral portion 40 includes a crown 62 extending radially outwards from the cylinder 54. The crown 62 includes a plurality of through bores 64 intended to allow the fixation of the air diffuser 8 to a part, e.g., a steering end cover of the propulsion oriented device.

Figure 11:
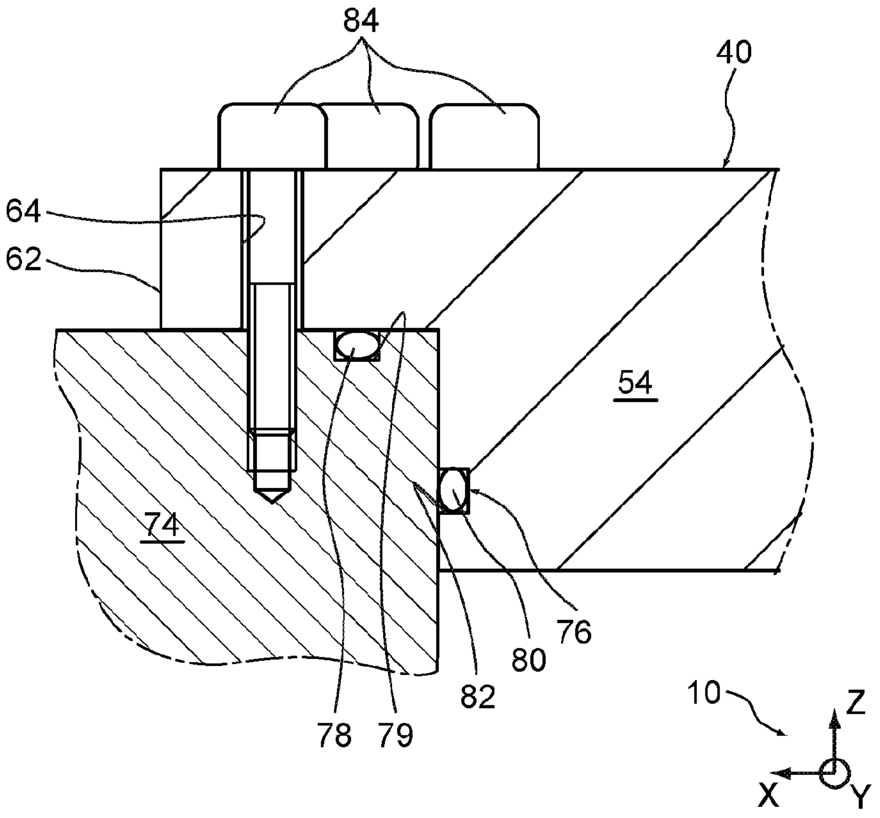
FIG. 11 is a detail view of a sealing arrangement between the air diffuser and the air box.

With reference to FIG. 11, there is depicted a seal arrangement 76 between the peripheral portion 40 and an end cover 74 of the propulsion oriented device. The end cover 74 may be attached to a mobile part of a steering arrangement of the propulsion oriented device. The seal arrangement 76 includes a static seal ring 78 received in a groove 79 of the end cover 74, and a static seal ring 80 received in a groove 82 of the cylinder 54. The seal ring 78 is in static axial contact with the crown 62 whereas the seal ring 80 is in static radial contact with a cylindrical surface of the end cover 74. A plurality of screws 84 attach the end cover 74 and the crown 62 to each other.

The peripheral portion 40 includes an upper collar 66 extending radially inwards from the cylinder 54 at its upper end 58. The upper collar 66 includes a radial inner edge 68 having the shape of a circle around the axis of rotation 4 and with a diameter $d_{68}$. In the depicted embodiment, the diameter $d_{68}$ is within a range 2350 mm to 2550 mm.

The peripheral portion 40 includes a cylindrical protrusion 70 extending axially upwards from the edge 68.

Hence, the collar 20, the collar 66, and the cylindrical protrusion 70 allow the fixation of a dynamic seal arrangement between a steering top cover and the air diffuser 8.

The air diffuser 8 further includes a plurality of attaching ribs 72, e.g., ten (10) attaching ribs 72. The attaching ribs 72 extend radially outwards from the lower end of the cylinder 42 and from the truncated cone 44. The attaching ribs 72 extend radially inwards from the cylinder 54 and axially downwards from the upper collar 66. Hence, the attaching ribs 72 allow attaching the main portion 38 and the peripheral portion 40.

The attaching ribs 72 are regularly spread over the circumference of the truncated cone 44. Hence, the angle $\beta$ between two adjacent ribs 72 is within a range to 30° to 50°. In the depicted embodiment, the angle between two adjacent ribs 72 is 36°.

In the depicted embodiment, the ribs 72 have a thickness within a range 12 mm to 20 mm, and more specifically a thickness being equal to 16 mm.

Figure 12:
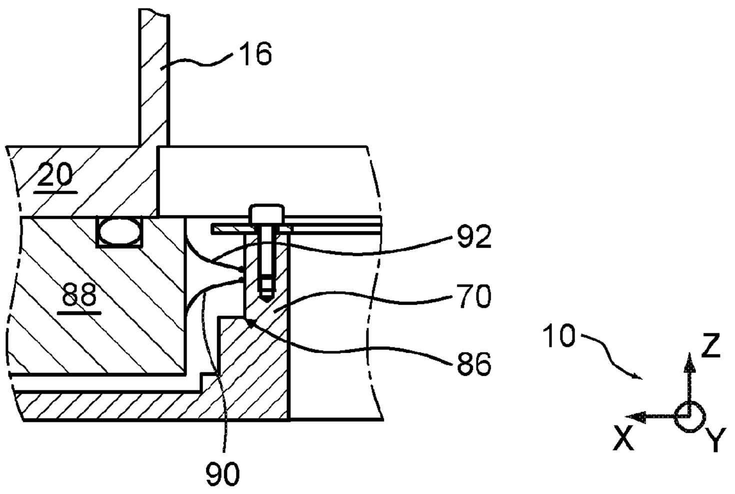
FIG. 12 is a detail view of a sealing arrangement between the air diffuser and an end cover of the propulsion oriented device.

Referring now to FIG. 12, a dynamic seal arrangement 86 is depicted between a steering top cover 88 and the air diffuser 8. Namely, the top cover 88 may be attached to a static part of the steering arrangement and the air box 6 may be attached to the top cover 88. The seal arrangement 86 may include a first lip seal 90 and a second lip seal 92 attached to the cylindrical protrusion 70. Using two lip seals for implementing dynamic sealing between the cylindrical protrusion 70 and the top cover 88 allows improving the sealing effect relative to the airflow passing through the cooling rotating interface, and relative to oil lubricating inside the steering arrangement.

Figure 10:
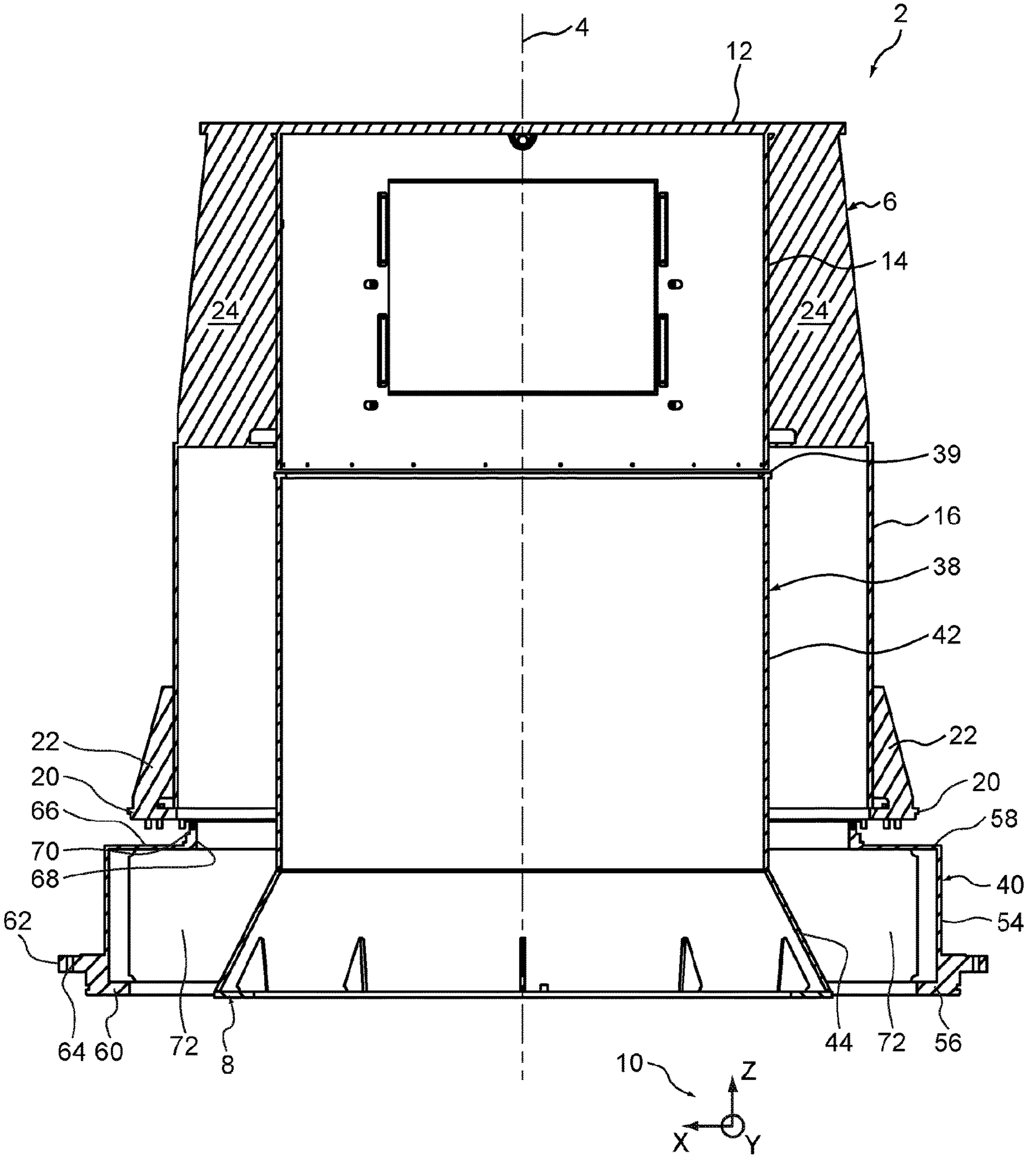
FIG. 10 is a cross-sectional view, taken along the same plane as FIG. 9, of the cooling rotating interface of FIG. 1.

As depicted on FIG. 10, when the peripheral portion 40 is located right below the cylinder 16, the main portion 38 is right below the cylinder 14. Hence, the main portion 38 is able to seal the first fluid path and the second fluid path from each other. Because the main portion 38 is a solid of revolution, the pressure drop in the first fluid path and in the second fluid path remain the same regardless of the angular orientation of the propulsion oriented device. Furthermore, due to the small thickness of the attaching ribs 52, the perturbations to the warm airflow circulating through the second fluid path are little.

The invention claimed is:

1. An air diffuser configured to be installed in a cooling rotating interface of a propulsion oriented device, the propulsion oriented device being pivotable relative to a vessel around an axis of rotation, the air diffuser capable of being attached to the propulsion oriented device, and including a main portion capable of being surrounded by an air box attached to the vessel so as to delimit, inside a volume delimited by the air box, a first fluid path for a cold fluid flow and a second fluid path for a warm fluid flow from each other, wherein the main portion is a solid of revolution around the axis of rotation, wherein the main portion includes a truncated cone having a first circular end of a first diameter and a second circular end of a second diameter, the second diameter being larger than the first diameter.

2. The air diffuser according to claim 1, wherein the main portion includes an inner cylinder of revolution around the axis of rotation.

3. The air diffuser according to claim 2, wherein the inner cylinder has a circular axial cross section, the air box has a circular axial cross section, and the axial cross section of the air box has a diameter equal to a diameter of the axial cross section of the inner cylinder multiplied by a factor within a range 1.3 to 1.5.

4. The air diffuser according to claim 1, wherein the truncated cone includes an inner protrusion extending radially inwards from the second circular end.

5. The air diffuser according to claim 1, further including a peripheral portion radially surrounding the main portion and including an outer cylinder of revolution intended to be located radially outwards the air box, with reference to the axis of rotation.

6. The air diffuser according to claim 5, wherein the outer cylinder has a circular axial cross-section, a diameter of the outer cylinder being equal to a diameter of the axial cross-section of the second circular end multiplied by a factor within a range 1.2 to 1.6.

7. The air diffuser according to claim 6, wherein the peripheral portion includes a crown protruding radially outwards from the outer cylinder.

8. The air diffuser according to claim 7, further including at least one static seal ring chosen among a first static seal ring in axial contact with the crown and a second static seal ring in radial contact with the outer cylinder.

9. The air diffuser according to claim 6, wherein the peripheral portion includes a first collar extending radially inwards from a first end of the outer cylinder, the first end being configured to be proximate to the vessel, the peripheral portion including a cylindrical protrusion extending axially from an inner edge of the first collar and on a side of the first collar opposite to the side in which the outer cylinder is located.

10. The air diffuser according to claim 5, further including a plurality of radially extending joining parts attaching the peripheral portion to the main portion.

11. The air diffuser according to claim 10, wherein the joining parts have a thickness along the tangential direction within a range 10 mm to 30 mm.

12. The air diffuser according to claim 11, wherein the range is 12 mm to 20 mm.

13. The air diffuser according to claim 10, wherein the joining parts are regularly spread over a circumference of the main portion so that an angle (β) between two adjacent joining parts taken among the plurality of joining parts is within 30° and 50°.

14. The air diffuser according to claim 1, wherein the first circular end is configured to be closer to the vessel than the second circular end.

15. A cooling rotating interface for a propulsion oriented device pivotable relative to a vessel around an axis of rotation, the cooling rotating interface including an air box configured to be attached to the vessel, a first fluid path for a cold fluid flow, a second fluid path for a warm fluid flow, and an air diffuser according to claim 1, wherein the air diffuser delimits the first fluid path and second fluid path from each other.

16. The cooling rotating interface according to claim 15, wherein the air box includes a part of revolution coaxial to the main portion, the cooling rotating interface including a labyrinth seal located axially between the air diffuser and the part of revolution.

* * * * *